May 19, 1970 — A. SUTARUK — 3,512,622
FLUID COUPLING
Filed Aug. 11, 1967
4 Sheets-Sheet 1
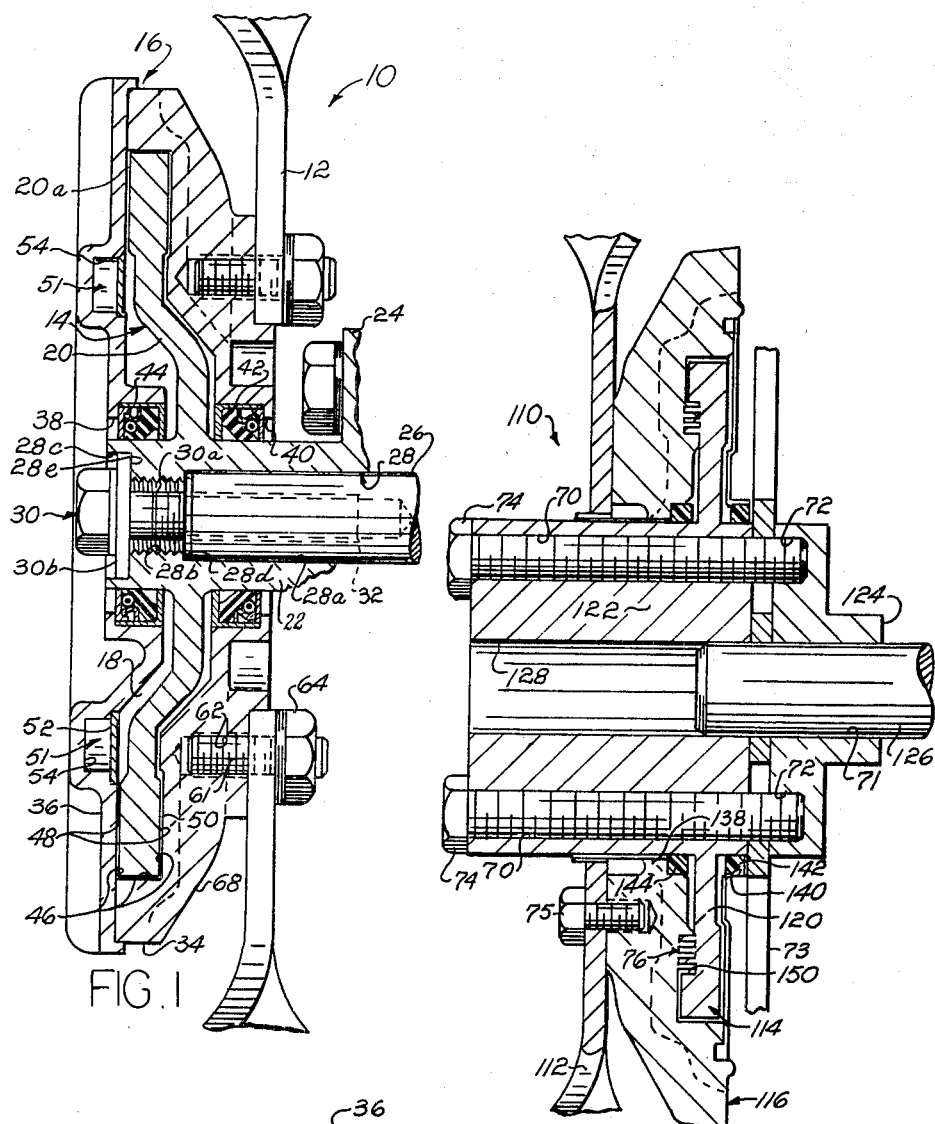
FIG. 1
FIG. 4
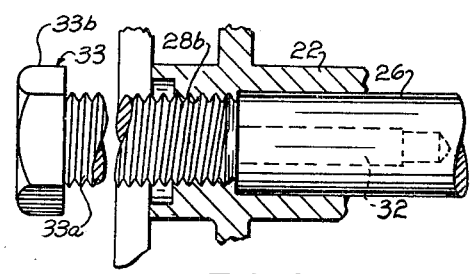
FIG. 2
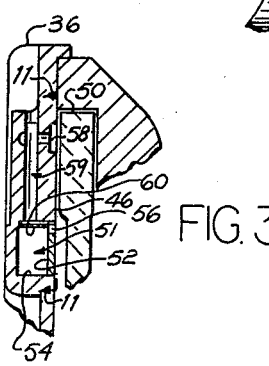
FIG. 3
INVENTOR
ALEX SUTARUK
BY Yount, Raney, Flynn & Tarolli
ATTORNEYS INVENTOR
ALEX SUTARUK
BY *Yount, Raney, Flynn and Tarolli*
ATTORNEYS May 19, 1970  A. SUTARUK  3,512,622

FLUID COUPLING

Filed Aug. 11, 1967  4 Sheets-Sheet 3

INVENTOR
ALEX SUTARUK

BY Young, Raney, Flynn and Tarolli

ATTORNEYS

May 19, 1970 A. SUTARUK 3,512,622
FLUID COUPLING

Filed Aug. 11, 1967 4 Sheets-Sheet 4

INVENTOR
ALEX SUTARUK
BY Yount, Raney, Flynn and Tarolli
ATTORNEYS

& Towne Inc., Cleveland, Ohio, a corporation of Ohio# United States Patent Office 3,512,622
Patented May 19, 1970

3,512,622
FLUID COUPLING
Alex Sutaruk, Hazel Park, Mich., assignor to Eaton Yale
& Towne Inc., Cleveland, Ohio, a corporation of Ohio
Filed Aug. 11, 1967, Ser. No. 659,943
Int. Cl. F16d *19/00, 31/06*
U.S. Cl. 192—58                    15 Claims

ABSTRACT OF THE DISCLOSURE

An improved fluid coupling includes relatively rotatable input and output coupling members. The input coupling member drives the output coupling member through a fluid shear medium located in a working chamber of the coupling. The fluid shear medium provides the only bearing between the relatively rotatable coupling members.

---

The present invention relates to fluid couplings and particularly to fluid couplings having relatively rotatable input and output coupling members, and a fluid shear medium between the coupling members operable to transmit torque between the input and output coupling members.

An important object of the present invention is to provide a new and improved fluid coupling having relatively rotatable coupling members, the coupling members including spaced opposed shear surfaces which cooperate with a fluid shear medium therebetween to transmit torque between the coupling members, and wherein the volume of the fluid shear medium between the shear surfaces can be varied and provides the only bearing between the relatively rotatable coupling members.

Another object of the present invention is to provide a new and improved fluid coupling having relatively rotatable input and output coupling members and wherein the output coupling member has a metallic surface portion defining a groove within which a metallic peripheral surface portion of the input coupling member is disposed in spaced relationship and a fluid shear medium disposed in the space between the coupling members operates to transmit torque therebetween and provides the only bearing between the coupling members.

Another object of the present invention is the provision of a new and improved fluid coupling having relatively rotatable input and output coupling members and wherein the input coupling member has an axially extending hub and the output coupling member has a central opening through which the hub extends and a clearance exists between the hub and opening which is closed by a rotary seal to prevent fluid leakage.

Still another object of the present invention is the provision of a new and improved fluid coupling having relatively rotatable input and output coupling members and wherein the input coupling member has a radially extending portion and a hub portion which extends axially on opposite sides of the radially extending portion and extends through central openings in the output coupling member and a pair of rotary seals are disposed in the clearance between the axially extending hub portion and the openings of the output coupling member to prevent fluid leakage.

A further object of the present invention is the provision of a new and improved coupling in which torque is transmitted between relatively rotatable input and output coupling members and wherein a hub of the input coupling member is drivingly connected to a shaft by a press fit which is effected by a member having a head portion which abuts the hub and a threaded portion threadably engaging a threaded aperture in the shaft in response to rotation of the member in a direction to cause the hub to move axially onto the shaft.

A still further object of the present invention is the provision of a new and improved coupling having an output coupling member and a relatively rotatable input coupling member press fit onto a shaft and wherein the input coupling member can be readily disassembled from the shaft by a member having a threaded shank which threadably engages a threaded portion of a shaft receiving aperture in the input coupling member in response to rotation of the member in a direction to cause the end of the member to abut the end of the shaft and move the input coupling member axially relative to the shaft.

Further objects and advantages of the present invention will become apparent from the following detailed description made with reference to the accompanying drawings and in which:

FIG. 1 is an axial sectional view of a fluid coupling embodying the present invention;

FIG. 2 is a fragmentary sectional view of a portion of the coupling of FIG. 1 and illustrating the manner of removing one of the coupling members from the shaft upon which it is mounted;

FIG. 3 is a fragmentary sectional view of another portion of the coupling of FIG. 1;

FIG. 4 is an axial sectional view of another fluid coupling embodying the present invention;

Figure 5:
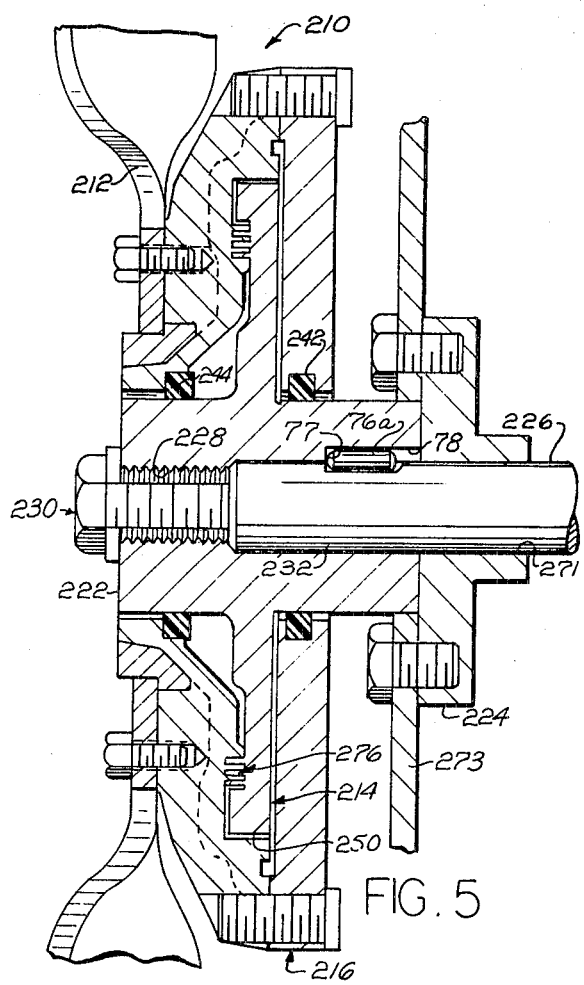
FIG. 5 is an axial sectional view of still another fluid coupling embodying the present invention.

The present invention provides an inexpensive and reliable fluid coupling having relatively rotatable input and output coupling members and in which a fluid shear medium between the coupling members transmits torque from the input coupling member to the output coupling member when the input coupling member is driven. The coupling members are arranged so that the shear fluid disposed therebetween during rotation of the input coupling member provides the only bearing between the coupling members. The fluid coupling embodying the present invention is suitable to couple various driving units to units to be driven thereby and is particularly suitable for coupling a vehicle motor to various accessories therefor such as the water pump, radiator fan, etc. Accordingly, the various fluid coupling embodiments, representing preferred embodiments of the invention, will be described as driving vehicle accessories from the vehicle engine.

As representing one preferred embodiment of the invention, a fluid coupling 10 is disclosed in FIG. 1 for driving a fan 12 from the crankshaft of a vehicle motor. The fluid coupling 10 includes relatively rotatable input and output coupling members 14 and 16, respectively. The input coupling member 14 is driven from the crankshaft of the vehicle motor and when so driven rotates in a working chamber 18 defined by the output coupling member 16.

The input coupling member 14 comprises a radially extending portion 20 having a peripheral portion 20a and an integrally formed hub portion 22. The hub portion 22 extends axially on opposite sides of the radially extending portion 20. One end of hub 22 has a radially extending flange 24 partially illustrated in FIG. 1. The flange 24 is operatively connected to a pulley which in turn is driven preferably by a belt drive from the crankshaft. The hub 22 is press fit onto the end of a shaft 26 which may drive the water pump of the vehicle engine. Rotation of flange 24 imparts rotation to the input coupling member 14 and water pump shaft 26.

The present invention provides a quick and simple arrangement for press fitting hub 22 onto the end of shaft 26 and for removing the hub 22 from the shaft. The hub 22 has an opening indicated generally as 28 extending therethrough. The opening 28 comprises opening portions 28a, 28b, and 28c of different diameters. Opening portion 28a receives the end of shaft 26 and the intermediate opening portion 28b is threaded and is of a diameter smaller than the adjacent opening portions 28a and 28c and define radially extending shoulders 28d and 28e. To press fit the hub 22 onto the end of shaft 26, the hub 22 is positioned so that opening portion 28a is aligned with the end of shaft 26. A threaded fastener or member 30 is threaded into a threaded aperture 32 in the end of shaft 26. Rotation of fastener 30 in aperture 32 moves the hub axially relative to the axially fixed shaft forcing the hub and shaft into a press-fit relationship. The threaded fastener 30 comprises a threaded shank 30a, a washer providing an abutment 30b, and a head 30c. To accomplish the press-fit relationship, the threaded fastener is extended through the aperture 28 into threaded engagement with the aperture 32 in the shaft. The fastener 30 is rotated by a suitable tool until the washer 30b abuts the radially extending shoulder 28e of the hub. Continued rotation of fastener 30 drives the hub onto the shaft until the radially extending shoulder 28d in the hub portion 22 abuts the end of the shaft. The fastener 30 is preferably left in its assembled relationship in the coupling eventhough the press-fit will hold the hub on the shaft. The washer 30b prevents dirt and other debris from entering the hub. It should be apparent that the washer 30b could be eliminated by reducing the diameter of threaded opening 28b and/or increasing the size of the head of member 30 and the head of member 30 would directly engage and drive the flange 24 onto shaft 26.

FIG. 2 discloses an arrangement whereby the hub portion 22 can be removed from its press-fit relationship on the shaft 26. To remove the hub 22 from the shaft 26, the threaded fastener 30 is removed and a second threaded fastener 33 is threaded into the threaded portion 28b of the opening 28. The fastener 33 has a threaded shank 33a having an end of a diameter larger than the diameter of the aperture 32 in the shaft 26. Head 33b of the fastener 33 is engaged by a suitable tool, such as a wrench, and rotates the threaded shank in the threaded portion 28b of the hub until the end thereof abuts the end of shaft 26. Continued rotation of the fastener 33 causes axial leftward movement of the hub 22 relative to the axially fixed shaft 26 and shank 33a. The threaded shank 33a continues to drive the hub therealong until it clears the end of shaft 26.

Rotation of the input coupling member 14 transmits torque to the relatively rotatable output coupling member 16 through a fluid shear medium, such as silicone fluid. The output coupling member comprises a disc-shaped cover member 34 and a plate-like cover member 36. The cover members 34 and 36 are joined at their peripheries by any suitable connector means and are sealed to prevent fluid leakage. The cover members cooperate to form the working chamber 18 within which the input coupling member 14 rotates. The cover members 34 and 36 have annular openings or passages 38 and 40 at their central portions through which the radially extending hub 22 of the input coupling member 14 extends. The diameter of the openings 38 and 40 is greater than the corresponding outside diameter of hub portion 22 to provide a clearance therebetween. Suitable commercially available seals 42 and 44 are secured to the central portions of the cover members 34 and 36, respectively, and are carried thereby. The seals have a flexible member which engages hub portion 22 and prevents fluid leakage thereabout.

The output coupling member 16 has a metallic surface portion 46 defining an annular groove within which the peripheral metallic portion 20a of the input coupling member 14 is disposed for rotation relative thereto. Preferably, the input coupling member is hardened steel or iron and the output coupling member is aluminum, but any compatible materials may be used which will not gall at start-up before the fluid film is established therebetween. The peripheral portion 20a has a shear surface 48 which is spaced from and opposed to shear surface 46 of the output coupling member and defining therebetween a shear space 50. As the peripheral portion 20a rotates, the shear surface 48 drags the shear fluid in shear space 50 around with it. The shear action of the fluid imparts movement to the shear surface 46 on the output coupling member causing the output coupling member to rotate and drive the fan 12.

It should be noted that no roller or other type of anti-friction bearings are employed to rotatably support the output coupling member 16 on the input coupling member 14 or on the shaft 26. The bearing function is performed exclusively by the shear fluid medium in the shear space 50. The shear surfaces 46 and 48 are spaced a sufficient distance so that they do not engage during normal operation. These surfaces should be distinguished from surfaces which are closely spaced to provide for only a thin film of lubricating fluid therebetween. Consequently, the shear fluid between the coupling members provides the only bearing for the output coupling member 16.

The fluid for the coupling 10 is maintained in a fluid reservoir 51. The reservoir 51 is provided by an annular groove 54 in cover member 36. The groove 54 is closed along the portion thereof opposing the input coupling member 14 by a closure plate 52. Plate 52 is connected to the cover member 36 in any suitable manner and is sealed to prevent fluid leakage thereabout.

The fluid is directed from the fluid reservoir 51 into shear space 50 through an opening or openings 56 (FIG. 3) in plate 52. At start-up of the fluid coupling 10, most of the shear fluid is in the fluid reservoir 51. Centrifugal pressure acting on the fluid in reservoir 51 causes the fluid to flow through opening or openings 56 into the working chamber 18. The fluid flow continues until substantially all the fluid is evacuated from reservoir 51 and is in the shear space 50 at which time maximum fluid volume is established in the shear space 50.

Figure 11:
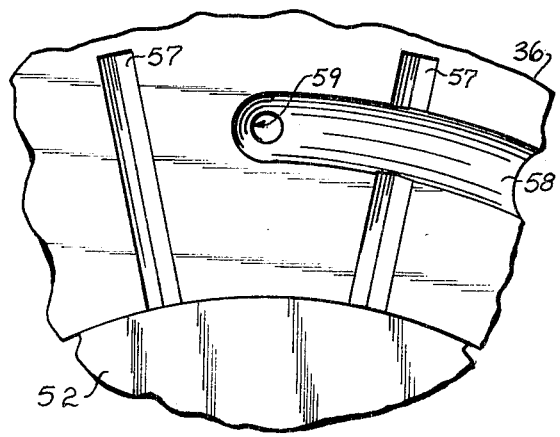
FIG. 11 is a sectional view taken substantially along line 11—11 of FIG. 3.

The fluid entering working chamber 18 is directed radially outwardly by the centrifugal force acting thereon and into the shear space 50. A plurality of slots 57 (FIG. 11) may be provided in cover members 34 and 36 to promote a hydrodynamic fluid film between the axially extending portions of shear surfaces 46 and 48 to support a thrust load. The slots 57 are generally V-shaped and are formed in the axial inner sides of the cover members 34 and 36.

The drive between the input and output coupling members is controlled so that when the temperature of the coupling 10 is below a predetermined temperature, the drive to fan 12 is substantially reduced. The fan 12 performs its usual function in the cooling system of a vehicle and, consequently, is not needed during cold operation of the vehicle engine. The drive is controlled by controlling the volume of shear fluid in shear space 50. The fluid is continually being evacuated from reservoir 51 into working chamber 18 through opening 56 and by controlling the flow of fluid from the working chamber 18 into reservoir 51, the volume of fluid in shear space 50 can be controlled. The flow of fluid into reservoir 51 is controlled by a suitable fluid conducting means.

The fluid conducting means of the illustrated embodiments of FIGS. 1–3, 9 and 10 is similar to the fluid conducting means disclosed in my copending application, Ser. No. 527,255, filed Feb. 14, 1966. Reference may be made to my copending application for details of construction and operation of the fluid conducting means. Suffice it to say that the fluid conducting means includes an annular groove 58 in cover member 36 which operates to pump fluid into passageway 59 which communicates the pumping groove 58 with the fluid reservoir 51. The passageway 59 can handle a larger volume of fluid than opening 56 and fluid flow therethrough into reservoir 51 is controlled by a temperature responsive bi-metal valve 60. The temperature responsive valve 60 is supported in reservoir 51 adjacent the lower end of passageway 59 and controls fluid flow into the reservoir 51 by opening and closing passageway 59.

When the temperature ambient to the bi-metal valve member 60 is at or above a predetermined temperature, the valve member 60 assumes its closed position illustrated in FIG. 3 blocking flow into fluid reservoir 51 and provides a net increase in the fluid volume in shear space 50. The net increase in fluid volume increases the drive to fan 12. When the temperature ambient to the bi-metal valve member 60 is at or below a predetermined temperature, the bi-metal valve member 60 assumes its open position establishing flow into reservoir 51. Since the flow of fluid into reservoir 51 exceeds the flow therefrom, there is a net decrease in the fluid volume in shear space 50 reducing the torque transmitted between the coupling members 14 and 16.

The fan 12 is connected to the output coupling member 16 by passing openings in the inward ends of the fan blades over a threaded stud 61. The stud 61 is secured in a threaded opening 62 in the cover member 34 and has its outer end projecting axially beyond the outer surface of member 34. The fan blades are secured by nuts 64 threaded onto the end of the studs 61.

The cover members 34 and 36 have a plurality of cooling fins 66 and 68 formed integrally therewith. The fins 66 and 68 dissipate heat from the couplings to the air moving thereabout.

The fluid couplings disclosed in FIGS. 4–10 also employ fluid bearings between the input and output coupling members. In describing the other fluid coupling embodiments of the invention shown in FIGS. 4–10, parts which are similar but not necessarily idential to corresponding parts of the fluid coupling embodiment disclosed in FIGS. 1–3 will be identified with a common reference numeral with pre-fix numeral 1, 2, 3, 4, 5 or 6 added to identify the particular embodiment. For example, the fluid couplings disclosed in FIGS. 4 and 5 will be identified as 110 and 210, respectively. Consequently, only the more important features of the couplings of FIGS. 4–10 will be described in detail hereafter.

The fluid coupling 110 shown in FIG. 4 includes an input coupling member 114 driven from the crankshaft of the vehicle motor and an output coupling member 116 driven by the input coupling member 114. The input coupling member 114 has a hub portion 122 which is larger in relationship to the radially extending portion 120 as compared to the dimensional relationship of hub 22 and the radially extending portion 20 of the fluid coupling 10 of FIG. 1. The hub 122 has a centrally disposed aperture 128 and a plurality of threaded openings 70 spaced radially outwardly of the central opening 128. The flange 124 is separate from the hub 122 and has a central opening 71 axially aligned with the central opening 128 in the hub. The flange member 124 is press fit on shaft 126 and has a plurality of threaded openings 72 in the periphery thereof radially spaced from central opening 71 and which are aligned with the openings 70 in the hub. The water pump saft 126 extends through central opening 71 in flange 124 and opening 128 in hub 122. A connector or input member 73 operatively connected to the drive pulley is disposed between the flange 124 and the hub 122. The flange 124, connector member 73 and hub 122 are interconnected by a plurality of threaded fasteners 74 extending through the aligned openings 70, 72 in the hub and flange, respectively, and through aligned openings provided in the connector member 73.

The fan 112 is mounted on the forward side of the output coupling member 116. The fan blades are connected to the cover member by suitable threaded fasteners 75 which extend through openings provided in the fan blades and are threaded into threaded openings in the output coupling member 116.

The drive is transmitted from the crankshaft of the motor engine through the connector member 73 to the input coupling member 114 which in turn drives the output coupling member 116 through a fluid shear medium. A plurality of interdigitated lands and grooves 76 are provided on the input coupling members. The lands and grooves 76 define therebetween a shear space 150 which receives the shear fluid. The output coupling member 116 has a pair of rotary fluid seals 142, 144 which may be made of Teflon to prevent fluid leakage through the clearance between the axially extending hub 122 and the openings or passages 138, 140 in the output coupling member through which the hub 122 extends.

The fluid coupling 210 disclosed in FIG. 5 has a fan 212 mounted on the forward portion of the output coupling member 216, similar in this respect to the fluid coupling 110 of FIG. 4. The drive is transmitted to the hub 222 of the input coupling member 214 by a drive connector or input member 273 which has a centrally disposed opening through which the hub 222 of the input coupling member 214 extends. A flange member 224 abuts the end of the hub member 222 and is fixed to the water pump shaft 226. A plurality of bolts extend through aligned openings in the drive connector 273 and the flange 224. The shaft 226 extends through aligned openings 228, 271 in the hub and flange members, respectively. The flange member 224 is suitably secured to shaft 226 to rotate the shaft upon being driven by connector 273.

Drive is transmitted from the shaft 226 to hub 222 through a drive pin 76a. Pin 76a is disposed in recesses 77, 78 provided in the periphery of the shaft 226 and the hub member 222. The hub 222 is mounted on shaft 226 by axially aligning recess 78 with the drive pin 76a in recess 77 and sliding the hub onto the shaft until it abuts flange member 224. The hub is secured in the assembled relationship by a threaded fastener 230.

Figure 6:
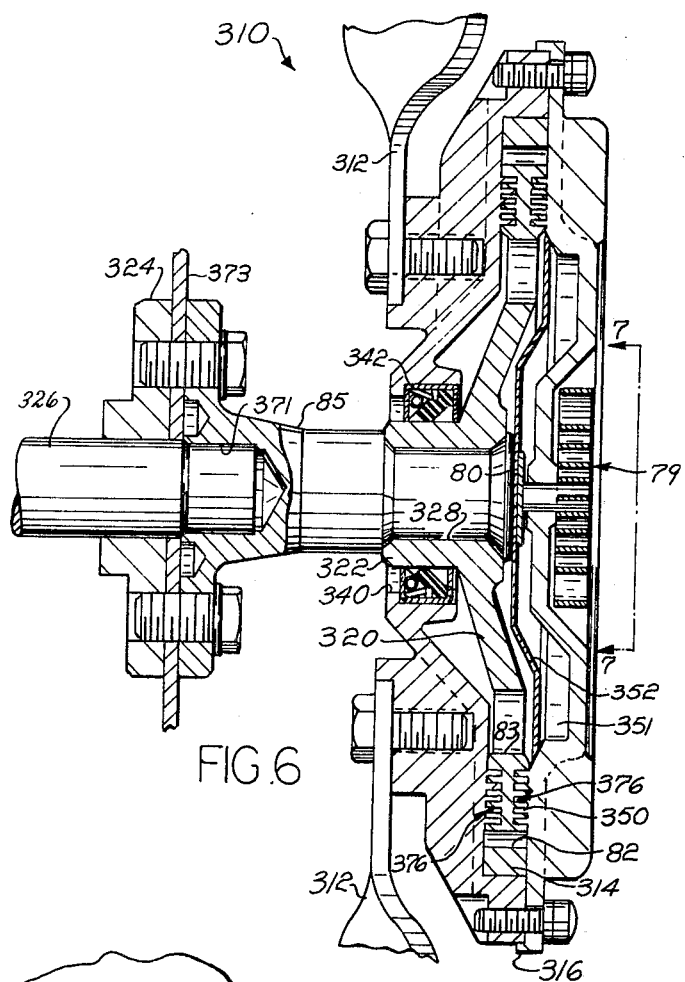
FIG. 6 is an axial sectional view of yet another fluid coupling embodying the present invention.
Figure 7:
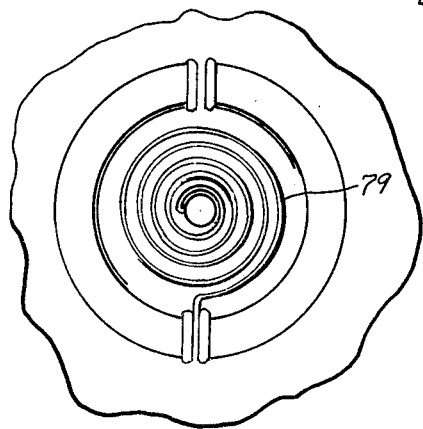
FIG. 7 is an elevational view of a part of a coupling disclosed in FIG. 6 looking in the direction indicated by arrow 7—7 therein.

The fluid coupling 310 disclosed in FIG. 6 has a temperature responsive means 79 for varying the volume of fluid in the shear space 350 in response to changes in the temperature ambient to the fluid coupling 310. The input and output coupling members 314, 316 have opposed interdigitated lands and grooves 376 along opposite axial sides of the input coupling member 314 and define therebetween shear space 350. The fluid for the coupling is maintained in a fluid reservoir 351 on the output coupling member 316. The fluid is directed from the reservoir 354 through passageways which, in this embodiment, are openings in the partition plate 352 forming one side of the reservoir. The openings are controlled by a valve member 80 which is moved transversely to the axis of the openings in plate 352.

The valve member 80 is moved between open and closed positions by the temperature responsive means 79 which is in the form of a coil. The coil 79 is supported on the front face in a recessed portion of the cover member. Upon sensing a change in temperature ambient to the coil 79, the coil winds and unwinds rotating the connected valve member 80 to open and close the openings in the plate 352 to control the flow of fluid into the working chamber 318. The vertically extending portion 320 of the input coupling member 314 has axially extending openings 82, 83 on opposite sides of interdigitated lands and grooves 376. Openings 82, 83 provide for circulation of the shear fluid to the interdigitated lands and grooves 376. For a more complete description of the fluid control system, see my copending application, Ser. No. 315,972, filed Oct. 14, 1963 and now Pat. No. 3,263,783, which discloses a fluid coupling having a similar fluid control system.

The input coupling member 314 has a hub 322 which extends from one axial side only of the radially extending portion 320. The output coupling member 316 has a single opening or passage 340 through which the hub 322 extends and provides a clearance which is closed by a rotary fluid seal 342. The hub portion 322 has an opening 328 which receives one end of an intermediate flange member 85. The end of the flange member 85 is balled over to secure the flange member 85 to the input coupling member 314. The opposite end of the flange member 85 has a radially extending flange which is connected to the drive connector or input member 373 of a drive pulley and a drive flange 324 for the water pump by bolts and nuts. The flange end of the intermediate flange member 85 has an opening 371 terminating therein which receives one end of the water pump shaft 326. The member 373 drives the flange members 85 and 324 which drive the input coupling member 314 and the water pump shaft 326, respectively.

Figure 8:
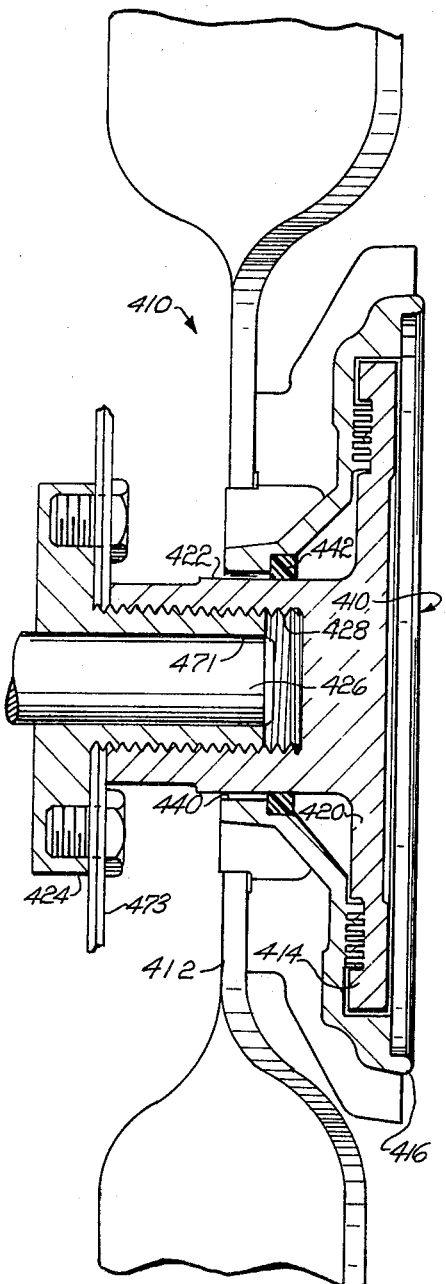
FIG. 8 is an axial sectional view of a further fluid coupling embodying the present invention.

The fluid coupling 410 shown in FIG. 8 includes an input coupling member 414 and output coupling member 416. The input coupling member has a hub portion 422 extending axially from one side of a radially extending portion 420. The hub 422 has an opening 428 in the end thereof remote from the radially extending portion 420. The opening 428 is threaded and is adapted to threadably receive a threaded end of a flange member 424. The flange member 424 has a radially extending flange and a plurality of openings in the flange which are aligned with openings in the drive connector or input member 473. The flange member 424 and drive connector member 473 are interconnected by fasteners extending through the aligned openings. The flange member 424 has a central aperture 471 which receives the water pump shaft 426. The member 424 is preferably press fit onto the shaft 426. A rotary fluid seal 442 is provided in the clearance between the axially extending hub 422 and the central opening or passage 440 in the output coupling member.

Figure 9:
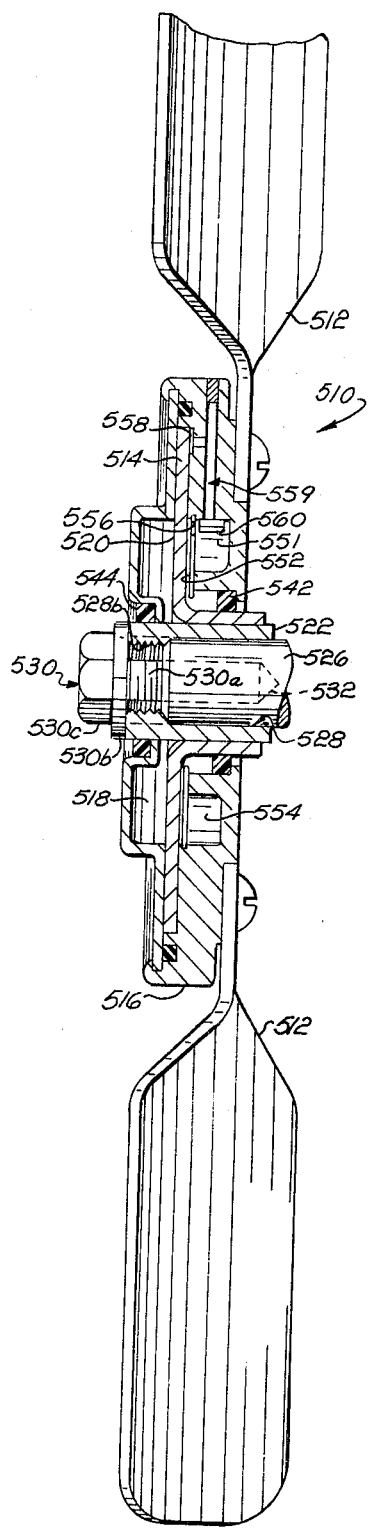
FIG. 9 is an axial sectional view of another fluid coupling embodying the present invention.
Figure 10:
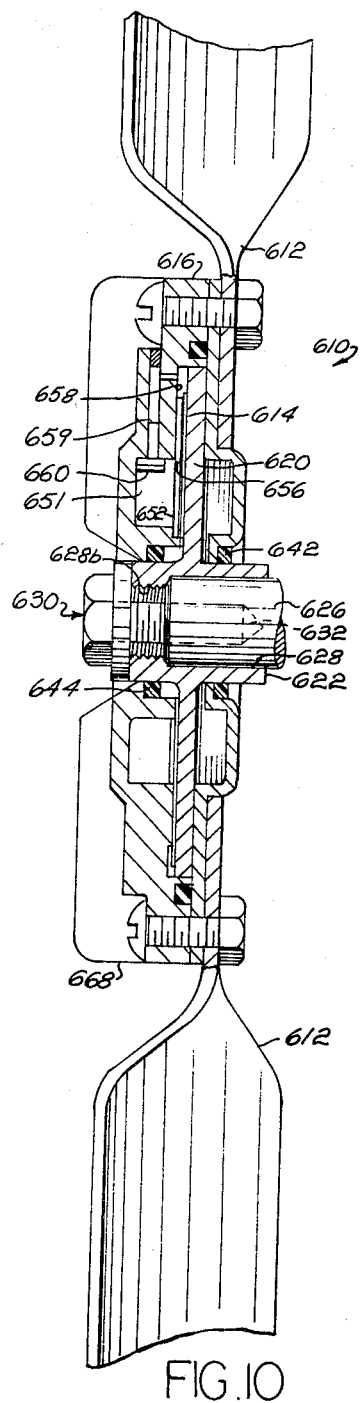
FIG. 10 is an axial sectional view of a still further fluid coupling embodying the present invention.

The fluid couplings 510 and 610 shown in FIGS. 9 and 10, respectively, are compact in design and inexpensive to manufacture and are intended primarily for use where these considerations are important. The coupling 510 shown in FIG. 9, includes relatively rotatable input and output coupling members 514 and 516, respectively. The input coupling member 514 has a hub 522 and a separate radially extending portion 520. The hub portion 522 and radially extending portion 520 are interconnected by suitable means, such as welding, to prevent relative rotation therebetween. The hub 522 has a central opening 528 therethrough within which one end of a shaft 526 is received. The aperture 528 has an unthreaded portion 528a and threaded portion 528b of different diameters. The hub 522 is press fit onto the end of the shaft 526 in the same manner as the hub 22 is press fit onto the shaft 26. Likewise, the hub 522 is removed from the shaft 526 by a threaded fastener similar in structure and operation to the fastener 33 used to remove hub 22 from shaft 26.

Fluid is directed from a fluid reservoir 554 formed in the output coupling member 516 into working chamber 518 through a passageway 553 controlled by a bi-metal valve member 559. The valve member 559 operates similar to the valve member 59 of the coupling 10.

The coupling 610 shown in FIG. 10 includes relatively rotatable input and output coupling members 614 and 616, respectively. The input coupling member 614 includes a radially extending portion 620 and an integrally formed hub portion 622. The hub portion 622 is press fit onto the end of the water pump shaft 626 in a manner similar to the press fitting arrangement described for coupling 510 of FIG. 9. The fluid is directed into the shear space 650 between the coupling members by a passageway 653 communicating a reservoir 654 with shear space 650. The passageway 653 is controlled by a bi-metal valve member 659 in reservoir 654 similar to valve member 59 of the fluid coupling 10.

A pair of fluid seals 642, 644, preferably Teflon seals, are carried by the output coupling member 616 and prevent fluid leakage thereabout. A plurality of cooling fins 688 are formed integrally with the front cover member of output coupling member 616 and provide for dissipation of heat from the coupling. The fan 612 is connected to the rear cover member by bolts extending through the cover members and fan blades. The bolts also function to interconnect the cover members.

From the foregoing, it should be apparent that the present invention provides fluid couplings in which the output coupling member bears on a film of shear fluid which transmits torque between the coupling members. The output coupling members of the fluid coupling embodiments have centrally disposed apertures through which the hubs of the input coupling members extend and the clearance therebetween is closed by rotary seals which bear very little, of any, support of the coupling member. Moreover, the output coupling members shown in FIGS. 1, 9 and 10 employ a simple and quick arrangement for press fitting a hub onto a shaft and for removing same when the coupling is to be disassembled.

Although the fluid coupling embodiments have been described in considerable detail herein, it is intended to cover all modifications, adaptations, and changes which come within the scope of the appended claims.

Having described my invention, I claim:

1. A fluid coupling comprising relatively rotatable input and output couling members, one of said coupling members defining a working chamber for holding a fluid shear medium and in which a radially extending portion of the outer coupling member is disposed, said radially extending portion being positioned in said chamber with its entire peripheral surface spaced from said one coupling member during rotation of said other coupling member to provide a shear space between said coupling members for receiving the fluid shear medium to thereby transmit torque between said input and output coupling members, said input coupling member having a centrally disposed axially extending hub portion, an aperture extending through said hub portion, a shaft adapted to be received in said aperture in a press fit relationship, first thread means on one end portion of said shaft, a member having an abutment at one end engageable with said hub portion, and second thread means adapted to threadably engage said first thread means, said second thread means cooperating with said first thread means and said member to press said abutment against said hub to cause said hub to move axially onto said shaft in response to relative rotation between said first and second thread means to thereby securely interconnect said input and output coupling members.

2. A fluid coupling as defined in claim 1, wherein said fluid shear medium provides the only bearing between said input and output coupling members, said fluid coupling further including fluid seal means between said coupling members to prevent fluid leakage from said fluid coupling.

3. A fluid coupling as defined in claim 1, further comprising means for controlling the volume of fluid in said shear space including a fluid reservoir for said fluid shear medium, passageway means communicating said fluid reservoir and said shear space, and a temperature responsive valve member operable to open and close said passageway means in response to a change in temperature.

4. A fluid coupling as defined in claim 1, further including a drive shaft operatively connected to said other coupling member, drive means operatively connected to said drive shaft at one axial side of said one coupling member, and a fan operatively connected to said one coupling member at another axial side thereof opposite one axial side.

5. A fluid coupling as defined in claim 1, wherein said coupling members are metallic and said fluid shear medium acting against metallic surfaces of said coupling members provides the only bearing between said coupling members.

6. A fluid coupling as defined in claim 5, wherein one of said metallic surfaces is steel and the other of said shear surfaces is aluminum.

7. A fluid coupling comprising relatively rotatable input and output coupling members, one of said coupling members defining a working chamber in which at least a portion of the other coupling member is disposed, opposed shear surfaces on said coupling members, said shear surfaces being spaced and defining a shear space therebetween, fluid shear means in said shear space for transmitting torque between said shear surfaces, said input coupling member having a centrally disposed axially extending hub portion, an aperture extending through said hub portion, a shaft adapted to be received in said aperture in a press fit relationship, a threaded aperture in one end of said shaft, a member having an abutment at one end engageable with said hub portion and a threaded shank adapted to threadably engage said threaded aperture in said shaft, said abutment and said threaded shank engaging said hub and said threaded aperture, respectively, in response to rotation of said member and causing said hub to move axially onto said shaft.

8. A fluid coupling as defined in claim 7, wherein said hub portion extends axially from both axial sides of said radially extending portion.

9. A fluid coupling comprising relatively rotatable coupling members, one of said coupling members defining a chamber within which the other coupling member rotates, said other coupling member being a unitary structure having a radially extending portion in said chamber and a hub portion extending axially from said radially extending portion, said hub portion having a centrally disposed aperture terminating within said hub portion and adapted to receive an end portion of a shaft, said one coupling member having a central opening through which said hub portion of said other member extends, the relative sizes of said opening and said hub portion providing a radially extending clearance space therebetween, a fluid seal means in said clearance space to prevent fluid leakage therethrough, said radially extending portion of said other member and said one member having spaced opposed shear surfaces defining therebetween a shear space, and a shear fluid medium in said shear space and cooperating with said shear surface to transmit torque therebetween.

10. A fluid coupling as defined in claim 9, wherein said aperture is threaded, a drive member having an axially extending externally threaded portion threadably disposed in said threaded aperture of said hub, a central opening in said drive member, and a drive shaft disposed in said opening.

11. A fluid coupling comprising relatively rotatable coupling members, one of said coupling members defining a chamber within which the other coupling member rotates, said other coupling member being a unitary structure having a radially extending portion in said chamber and a hub portion extending axially from said radially extending portion, said hub portion having a centrally disposed aperture extending through said hub portion and adapted to receive an end portion of a shaft, a shaft having an end portion in said aperture in said hub portion, said shaft having a threaded opening in said end portion, threaded fastener means having an abutment at one end engaging said hub portion and a threaded shank portion threadably engaged in said threaded aperture in said shaft, said one coupling member having a central opening through which said hub portion of said other member extends, the relative sizes of said opening and said hub portion providing a radially extending clearance space therebetween, a fluid seal means in said clearance space to prevent fluid leakage therethrough, said radially extending portion of said other member and said one member having spaced opposed shear surfaces defining therebetween a shear space, and a shear fluid medium in said shear space and cooperating with said shear surface to transmit torque therebetween.

12. A fluid coupling as defined in claim 11, wherein said aperture in said hub portion has a threaded portion adapted to receive a threaded fastener of a diameter larger than the diameter of said threaded aperture in said shaft whereby threading said fastener into said threaded portion of said hub aperture so that the end thereof abuts said shaft and operates to remove said hub portion from said shaft.

13. A fluid coupling comprising relatively rotatable coupling members, one of said coupling members defining a chamber within which the other coupling member rotates, said other coupling member being a unitary structure having a radially extending portion in said chamber and a hub portion extending axially from said radially extending portion, said hub portion having a centrally disposed aperture therein adapted to receive an end portion of a shaft, a recess in said aperture, a cooperating recess in said hub portion, a drive pin disposed in said recesses and operable to transmit drive between said shaft and said hub portion, said one coupling member having a central opening through which said hub portion of said other member extends, the relative sizes of said opening and said hub portion providing a radially extending clearance space therebetween, a fluid seal means in said clearance space to prevent fluid leakage therethrough, said radially extending portion of said other member and said one member having spaced opposed shear surfaces defining therebetween a shear space, and a shear fluid medium in said shear space and cooperating with said shear surface to transmit torque therebetween.

14. A fluid coupling comprising relatively rotatable coupling members, one of said coupling members defining a chamber within which the other coupling member rotates, said other coupling member being a unitary structure having a radially extending portion in said chamber and a hub portion extending axially from said radially extending portion, said one coupling member having a central opening through which said hub portion of said other member extends, the relative sizes of said opening and said hub portion providing a radially extending clearance space therebetween, a fluid seal means in said clearance space to prevent fluid leakage therethrough, said radially extending portion of said other member and said one member having spaced opposed shear surfaces defining therebetween a shear space, and a shear fluid medium in said shear space and cooperating with said shear surface to transmit torque therebetween, said hub portion having a centrally disposed aperture therein adapted to receive an end portion of a shaft, said hub portion further included a plurality of first axially extending openings spaced radially outwardly of said centrally disposed aperture, input means having a centrally disposed aperture aligned with said centrally disposed aperture in said hub and a plurality of second openings spaced from said central opening and aligned with said first openings in said hub portion, a connector member having a centrally disposed aperture aligned with said centrally disposed aperture in said input means, a plurality of openings disposed radially outwardly of said central opening and aligned with said second and first openings, a shaft extending through said aligned central apertures in said hub, said input means and said connector member, and fastener means disposed in said plurality of axially aligned first, second, and third openings whereby driving said input means drives said hub portion and said shaft.

15. A fluid coupling comprising relatively rotatable input and output coupling members, said input coupling member having a centrally disposed axially extending hub portion, an aperture extending through said hub portion, a shaft adapted to be received in said aperture in a press fit relationship, a threaded aperture in one end of said shaft, a member having an abutment at one end engageable with said hub portion and a threaded shank adapted to threadably engage said threaded aperture in said shaft, said abutment and said threaded shank engaging said hub and said threaded aperture, respectively, in response to rotation of said member and causing said hub to move axially onto said shaft, said aperture in said hub having a threaded portion adjacent the end of said shaft and adapted to receive a threaded shank having an end portion engageable with said shaft whereby rotation of said threaded shank operates to move said hub axially away from said shaft.

References Cited

UNITED STATES PATENTS

| 3,011,607 | 12/1961 | Englander | 192—58 |
| 2,926,546 | 3/1960 | Paulsen. | |
| 3,007,560 | 11/1961 | Weir. | |
| 3,262,528 | 7/1966 | Weir. | |
| 3,295,639 | 1/1967 | Smith. | |

FOREIGN PATENTS 866,879   5/1961   Great Britain.

MARK M. NEWMAN, Primary Examiner

A. D. HERRMANN, Assistant Examiner

U.S. Cl. X.R.

192—82